United States Patent [19]

Kimura et al.

[11] Patent Number: 4,983,470
[45] Date of Patent: Jan. 8, 1991

[54] PROTECTIVE MATERIAL FOR MOLTEN CARBONATE FUEL CELL

[75] Inventors: Hiroshi Kimura; Kazunao Sato; Mitsuie Matsumura; Chika Hirai, all of Hyogo, Japan

[73] Assignee: Mitsubishi Denki Kabushiki Kaisha, Japan

[21] Appl. No.: 485,836

[22] Filed: Feb. 28, 1990

Related U.S. Application Data

[63] Continuation of Ser. No. 236,732, Aug. 26, 1988, abandoned.

[30] Foreign Application Priority Data

Aug. 28, 1987 [JP] Japan .................................. 62-212981
May 7, 1988 [JP] Japan .................................. 63-110817

[51] Int. Cl.⁵ ............................................. H01M 8/14
[52] U.S. Cl. ...................................... 429/16; 429/19; 429/46
[58] Field of Search ...................... 429/17, 19, 16, 46; 501/65

[56] References Cited

U.S. PATENT DOCUMENTS

| | | | |
|---|---|---|---|
| 4,182,795 | 1/1980 | Baker et al. | 429/13 |
| 4,437,192 | 3/1984 | Fujiu et al. | 501/65 |
| 4,774,152 | 9/1988 | Matsumura et al. | 429/12 |
| 4,788,110 | 11/1988 | Bernard | 429/19 |

OTHER PUBLICATIONS

King et al., "Molten Carbonate Fuel Cell System Verification and Scale-Up", EM-2502, Interim Report, Jul. 1982, pp. 3-22 and pp. 3-23.
King et al., "Molten Carbonate Fuel Cell System Verification and Scale-Up", EM-1481, Interim Report, Jan. 1981, pp. 2-35-pp. 2-38.

Primary Examiner—Donald L. Walton
Attorney, Agent, or Firm—Leydig, Voit & Mayer

[57] ABSTRACT

A protective material for a molten carbonate fuel cell, which comprises a ceramic comprising an oxide material capable of chemically reacting with an electrolyte used in the molten carbonate fuel cell for generating electric energy by consuming hydrogen formed from a raw fuel such as hydrocarbons, or with a substance formed from the electrolyte. The protective material protects a reforming catalyst or component materials of the fuel cell power generation system from the electrolyte or the substance formed from the electrolyte.

18 Claims, 3 Drawing Sheets

F I G. 3
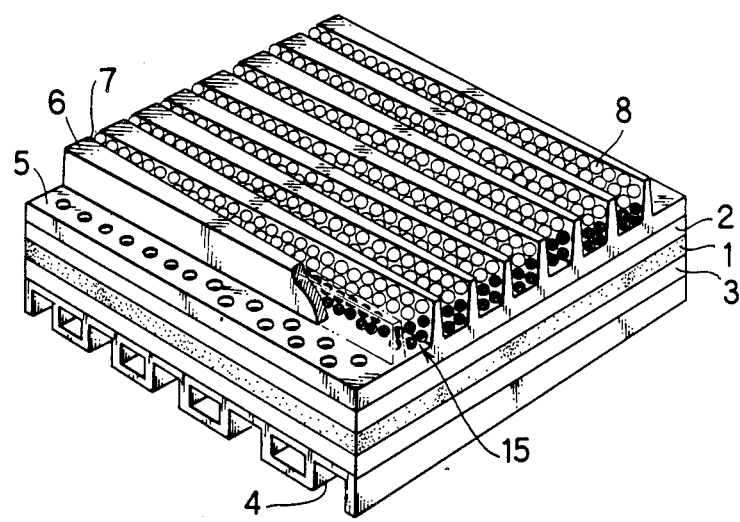

PROTECTIVE MATERIAL FOR MOLTEN CARBONATE FUEL CELL

This application is a continuation of application Ser. No. 236,732, filed Aug. 26, 1988, now abandoned.

BACKGROUND OF THE INVENTION

1. Field of the Invention

The present invention relates to a protective material capable of protecting a reforming catalyst and component materials from an electrolyte, in a molten carbonate fuel cell for generating electric energy by consuming hydrogen, which is formed from a raw fuel such as hydrocarbons.

2. Description of the Prior Art

FIG. 1 shows a perspective view of a major part of a conventional internal reforming type molten carbonate fuel cell disclosed in, for instance, Japanese Patent Application Laid-Open (KOKAI) No. 60-32255 (1985). In the figure, 1 denotes an electrolyte matrix composed of a porous ceramic with spaces therein filled with a carbonate used as an electrolyte, 2 denotes a fuel electrode (anode) composed of porous nickel or the like, and 3 denotes an oxidizing agent electrode (cathode) composed of a porous material such as nickel oxide. The fuel electrode 2 and the oxidizing agent electrode 3 are disposed opposite to each other, with the electrolyte matrix 1 therebetween, and these constitute a single unit of a cell. In the figure, 4 denotes an oxidizing agent passage provided for the oxidizing agent electrode 3, 5 denotes a perforated fuel-side spacer disposed in contact with the fuel electrode 2, and 6 denotes a rib provided perpendicularly to the fuel-side spacer 5, with the spacer 5 and the ribs 6 defining fuel gas passages 7. By 8 is denoted a fuel reforming catalyst packed in the fuel gas passages 7.

FIG. 2 shows a system diagram illustrating the construction of a fuel cell power generation system employing an external reforming type molten carbonate fuel cell body disclosed in Japanese Patent Application Laid-Open (KOKAI) No. 60-230365. In the diagram, a fuel treating device 9 and an air supply device 10 are connected to a molten carbonate fuel cell body 11. A combustor 12 is provided for oxidizing a fuel gas not reacted in the fuel cell body 11, a heat exchanger 13 is provided for removing surplus heat generated in the fuel cell body 11 to the exterior of the system, and a circulating blower 14 is provided for circulating an oxidized gas, which serves as a coolant.

Operations of the fuel cells will now be explained. In the internal reforming type fuel cell, the fuel reforming catalyst 8 provided in the fuel gas passages 7 adjacent to the fuel electrode 2 is used to induce a reforming reaction of a hydrocarbon or alcohol contained in the fuel gas, thereby forming hydrogen. Hydrogen thus formed through the reforming reaction in the fuel gas passages 7 is oxidized to water by an electrochemical reaction at the fuel electrode 2 adjacent to the passages 7. Part of the energy generated on the oxidation is converted to electric energy. For a long, stable operation of the internal reforming type fuel cell, therefore, it is essential to maintain a stable activity of the reforming catalyst 8 for a long time. However, in the conventional internal reforming type fuel cell, the reforming catalyst 8 is held adjacent to the fuel electrode 2 and, therefore, adhesion of the electrolyte to the reforming catalyst 8 is inevitable. On the other hand, the external reforming type fuel cell power generation system operates as follows. In a conventional fuel cell power generation system as shown in FIG. 2, the electrolyte or a substance formed therefrom which is contained in the fuel gas or oxidized gas discharged from the molten carbonate fuel cell body 11 is fed, as it is, downstream through the power generation system. This causes corrosion of component members of piping or apparatus, or lowering in the activity of the reforming catalyst. At a low-temperature part, in particular, problems such as solidification of the electrolyte and clogging of passages are generated. Thus, the conventional fuel cell power generation system has generally had the problem of reduction of the characteristics of the component apparatuses and the problem of a short service life.

Namely, in the conventional molten carbonate fuel cell power generation system as mentioned above, whether the molten carbonate fuel cell body is of the internal reforming type or of the external reforming type, the electrolyte evaporated or spattered into the reaction gas in the fuel cell body or the substance formed from the electrolyte will adhere to the materials constituting the fuel cell power generation system inclusive of the fuel cell body itself, to impair the characteristics of the constituent materials, thereby making it difficult to operate the system for a long time.

More particularly, for instance, the internal reforming type fuel cell body has the following problem. The reforming catalyst 8 is reduced in performance when contacted by the electrolyte held in the electrolyte matrix 1 or by decomposition products of the electrolyte. This arises from the migration of the electrolyte, through evaporation or the like, from the matrix 1 to the place where the reforming catalyst 8 is disposed. The degradation of the performance of the reforming catalyst 8, for instance, a nickel catalyst takes place as follows. When nickel particles (about 200 Å in diameter) makes contact with the electrolyte, nickel dissolves in the electrolyte as NiO, and growth of particles occurs. The particles grow to a particle size of about 500 to 3000 Å, with a reduction in surface area. Alternatively, the adhered electrolyte lowers the catalytic activity of the catalytically active substance (nickel particles). Thus, the performance of the catalyst is degraded. The dissolution of NiO in the electrolyte is discussed in literature [C. E. Baumgartner, "Solubility and Transport of NiO Cathodes in Molten Carbonate Fuel Cells", J. of American Ceramic Society, Vol. 69 (1986), pp. 162–168].

On the other hand, the use of the external reforming type fuel cell body has the following problems. First, the vapor of the electrolyte reacts with a main constituent material of piping or apparatus, for example, stainless steel parts at high-temperature, to form a corroded layer, thereby enbrittling or weakening the constituent material. In addition, adhesion or solidification of the electrolyte occurs at low-temperature parts to cause clogging, especially at narrow parts. Besides, as a total effect of the above, the electrolyte causes reduction in the characteristics and service life of the circulating blower 14, the heat exchanger 13, etc. For example, in a single-cell test on molten carbonate fuel cells, adhesion or solidification of the electrolyte was observed at narrow parts, particularly at an outlet pipe on the fuel gas side. For a steady operation, it was necessary to clean the piping, for instance, at a time interval of 1000 to 3000 hours.

SUMMARY OF THE INVENTION

The object of the present invention, attained for solving the above-mentioned problems, is to provide a protective material which is capable of preventing the degradation of a reforming catalyst in a molten carbonate fuel cell power generation system, protecting the component materials of a fuel cell body from an electrolyte and thereby preventing degradation of performance and ensuring a longer service life.

The protective material for a reforming catalyst used in a fuel cell according to the present invention comprises a ceramic comprising an oxide material capable of reacting with the electrolyte or a substance formed from the electrolyte.

Therefore, when the protective material for a reforming catalyst in a molten carbonate fuel cell according to the present invention, which includes a ceramic comprising an oxide material capable of reacting with the electrolyte or the substance formed from the electrolyte, is interposed between an electrolyte matrix and the reforming catalyst in the molten carbonate fuel cell, the protective material reacts with the electrolyte leaking from the electrolyte matrix or reaction products of the electrolyte, thereby preventing the electrolyte or the reaction products thereof from reaching the reforming catalyst.

The protective material for an electrolyte used in a molten carbonate fuel cell according to the present invention includes a ceramic comprising an oxide material capable of chemically reacting with the electrolyte in the fuel cell, and protects the component materials of a molten carbonate fuel cell power generation system from the electrolyte or the substances formed from the electrolyte.

Therefore, when the protective material is held in an appropriate place in a fuel gas system or an oxidized gas system in the fuel cell power generation system, the protective material reacts with the electrolyte leaking from the electrolyte matrix or reaction products of the electrolyte, thereby preventing the electrolyte or the reaction products from reaching the component materials of the power generation system.

Furthermore, when the protective material for the electrolyte contains an oxide material having a melting point lower than the temperature at which the fuel cell is used, the oxide material is melted to a liquid during use, thereby enabling rapid reaction thereof with the electrolyte or the reaction products of the electrolyte.

The above and other objects, features and advantages of the present invention will become apparent from the following description and appended claims, taken in conjunction with the accompanying drawings.

BRIEF DESCRIPTION OF THE DRAWINGS

FIG. 3 shows a perspective view of a major part of an internal reforming type molten carbonate fuel cell body employing the protective material for an electrolyte according to one embodiment of the present invention.

DETAILED DESCRIPTION OF THE PREFERRED EMBODIMENTS

Figure 1:
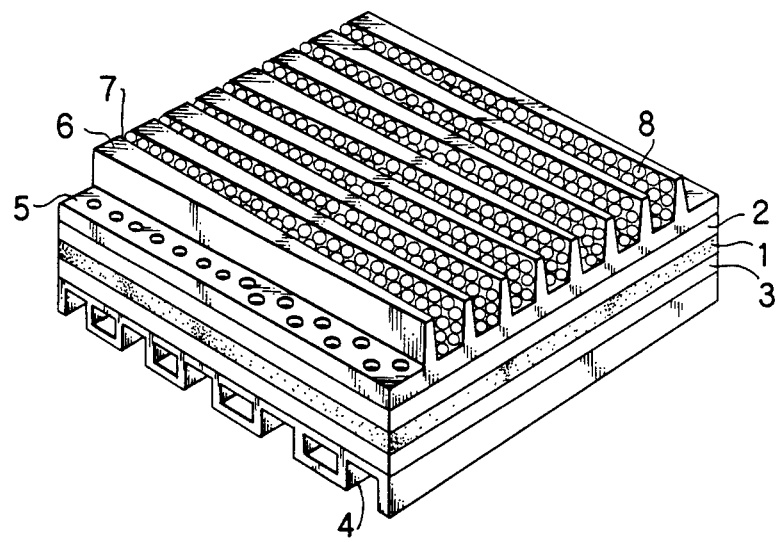
FIG. 1 shows a perspective view of a major part of a conventional internal reforming type molten carbonate fuel cell body.
Figure 2:
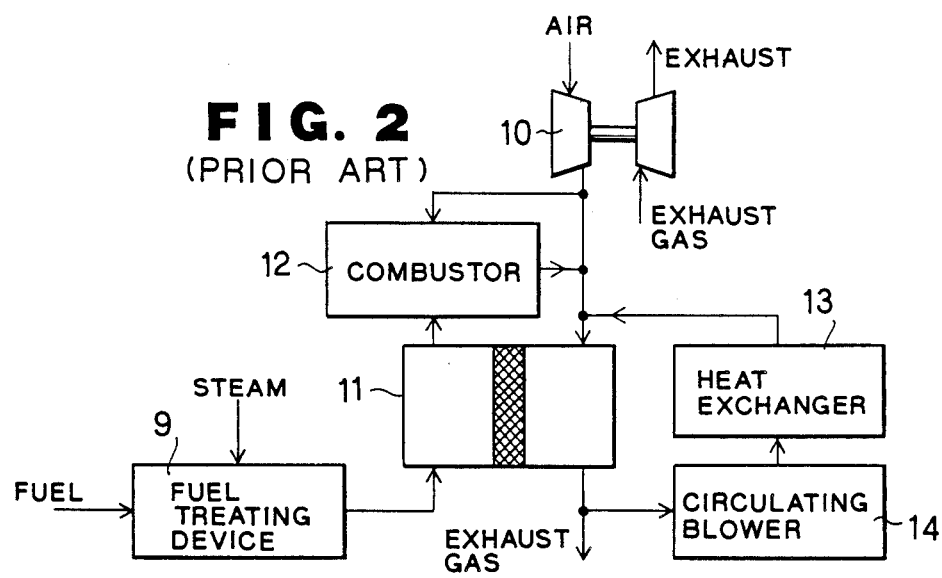
FIG. 2 shows a system diagram illustrating the construction of a conventional external reforming type molten carbonate fuel cell power generating system.

Of the materials usable as the oxide material for the protective material according to the present invention, those which are particularly preferable include, for example, $TiO_2$, $SiO_2$, $MoO_3$, $WO_3$, $ZrO_2$, $GeO_2$ and $B_2O_3$.

Where a mixture of $Li_2CO_3$ and $K_2CO_3$ is used as the electrolyte, for example, $TiO_2$, $MoO_3$, $WO_3$ and $ZrO_2$ powders can be selected as a material to be reacted with $K_2CO_3$, while $SiO_2$ and $GeO_2$ powders can be selected as a material to be reacted with $Li_2CO_3$, and $B_2O_3$ can be selected as a material to be reacted with both of the carbonates. Of these oxide materials, $B_2O_3$ has the lowest melting point, 450° C., and is capable of functioning as a binder for $TiO_2$ or $SiO_2$ powder.

Now, $TiO_2$ and $SiO_2$ will be taken as examples. After addition of $B_2O_3$ to $TiO_2$ or $SiO_2$ powder in an amount of 2 to 50% by weight, preferably 5 to 20% by weight, the admixture is molded in the shape of rods, pellets or disks, and the molded product is heated to a temperature of at least 450° C. for 10 min., whereby $B_2O_3$ can be melted, and a firm ceramic can be obtained upon cooling. When a mixture of both of the ceramics is used, it is possible to capture $Li_2CO_3$ and $K_2CO_3$.

Alternatively, $B_2O_3$ may be added to a mixed powder obtained by mixing $TiO_2$ and $SiO_2$ powders in a predetermined ratio, in an amount of 2 to 50% by weight, followed by molding the admixture. The ceramic thus obtained, when used singly, is capable of capturing both $Li_2CO_3$ and $K_2CO_3$.

The $TiO_2$ powder undergoes a chemical reaction upon contact with $K_2CO_3$, forming $K_2Ti_2O_5$ or the like. For example, the following reactions may take place.

$$SiO_2 + K_2CO_3 \rightarrow K_2SiO_3 + CO_2 \uparrow$$

$$2TiO_2 + K_2CO_3 \rightarrow K_2Ti_2O_5 + CO_2 \uparrow$$

Upon contact with $Li_2CO_3$, the $SiO_2$ powder forms $Li_2SiO_3$ or the like through a reaction, for example:

$$SiO_2 + Li_2CO_3 \rightarrow Li_2SiO_3 + CO_2 \uparrow$$

Upon contact with $K_2CO_3$ or $Li_2CO_3$, $B_2O_3$ forms $KBO_2$ or $LiBO_2$ or the like through reactions, for example:

$$B_2O_3 + K_2CO_3 \rightarrow 2KBO_2 + CO_2 \uparrow$$

$$B_2O_3 + Li_2CO_3 \rightarrow 2LiBO_2 + CO_2 \uparrow$$

The reaction of $K_2CO_3$ with $TiO_2$ or the reaction of $Li_2CO_3$ with $SiO_2$ proceeds at a very low rate if the electrolyte is not molten. On the other hand, when the electrolyte is molten (for example, a mixture of $Li_2CO_3$ and $K_2CO_3$ has a lowered melting point and is completely melted under the operating condition of the fuel cell), both of the reactions proceeds at a high rate. Since $B_2O_3$ melts at 450° C., the reaction thereof with the electrolyte takes place at a high rate even when the electrolyte is in a solid state.

This characteristic feature is particularly important to the application of the present invention where it is necessary to remove efficiently the vapor of the electrolyte contained in the reaction gas in an extremely low concentration, for instance, 0.001 mol % or below, under the actual use conditions of the fuel cell.

TABLE 1 shows the results of investigation of the reactivities of the oxide materials, which can be used in the present invention, with electrolyte, carried out by use of a differential scanning calorimeter (DSC).

TABLE 1

| Investigation results of reactivity of oxide materials with electrolyte | | | |
|---|---|---|---|
| | $Li_2CO_3$ (solid) | $K_2CO_3$ (solid) | $Li_2CO_3(62)$-$K_2CO_3(38)$ (liquid) |
| $TiO_2$(solid) | slow | slow | fast |
| $SiO_2$(solid) | slow | slow | fast |
| $B_2O_3$(liquid) | fast | somewhat slow | fast |
| $MoO_3$(solid) | slow | slow | fast |
| $WO_3$(solid) | slow | slow | fast |
| $ZrO_2$(solid) | slow | slow | fast |
| $GeO_3$(solid) | slow | slow | fast |

The above description pertains to $TiO_2$ and $SiO_2$ taken as examples of the protective material and referring to the addition of $B_2O_3$, but it should be noted that the protective material according to the present invention is not limited to $TiO_2$ and $SiO_2$.

$MoO_3$, $WO_3$, $ZrO_2$ and $GeO_2$ can also be used as a material for capturing the electrolyte, in the same manner as $TiO_2$ and $SiO_2$, because these oxides react with $K_2CO_3$ or $Li_2CO_3$ to form potassium molybdate, potassium tungstate, potassium zirconate and lithium germanate or the like, respectively.

The present invention will now be described more in detail while referring to the following examples.

EXAMPLE 1

To a $TiO_2$ powder having a particle diameter of 10 μm, 5% by weight of polyvinyl alcohol and 20% by weight of water were added, and after sufficient mixing, the mixture was molded by a pellet molder to prepare spherical pellets of 5 mm diameter. The pellets were packed into a fuel cell at the time of assembling the fuel cell, and were heated at the beginning of the fuel cell operation to evaporate off the residual binder and water.

EXAMPLE 2

Spherical pellets of 10 mm diameter were prepared in the same manner as in Example 1 except for using an $SiO_2$ powder of 30 μm particle diameter in place of the $TiO_2$ powder.

EXAMPLE 3

Spherical pellets of 5 mm diameter were prepared in the same manner as in Example 1 except for using an $MoO_3$ powder of 5 μm particle diameter in place of the $TiO_2$ powder.

EXAMPLE 4

Spherical pellets of 5 mm diameter were prepared in the same manner as in Example 1 except for using a $WO_3$ powder of 20 μm particle size in place of the $TiO_2$ powder.

EXAMPLE 5

To a $ZrO_2$ powder having a particle diameter of 3 μm, 10% by weight of $B_2O_3$ of 10 μm particle diameter was added, and after sufficient dry mixing, a suitable amount of an alcohol was added to the mixture, followed by molding by a pellet molder to prepare spherical pellets of 3 mm diameter.

EXAMPLE 6

To an $SiO_2$ powder having a particle diameter of 50 μm, 20% by weight of $B_2O_3$ of 30 μm particle diameter and 20% by weight of acetone were added, and after sufficient mixing, the mixture was molded by a pellet molder to prepare disk-shaped pellets of 10 mm diameter and 3 mm thickness.

EXAMPLE 7

A mixture of $TiO_2$ of 30 μm particle diameter with an $SiO_2$ powder of 30 μm particle diameter in a molar ratio of 1:2 was prepared. To the mixture, 5% by weight (based on the amount of the mixture) of a $B_2O_3$ powder of 10 μm particle diameter was added, and after sufficient mixing, the resultant mixture was molded by a pellet molder into a rod shape of 5 mm diameter and 200 mm length. The rod-shaped pellets were heated to 500° C. for 10 min, and taken out, thereby enhancing the strength of the pellets.

EXAMPLE 8

A mixture of a $GeO_2$ powder of 20 μm particle diameter with a $B_2O_3$ powder of 20 μm particle diameter in a molar ratio of 1:3 was prepared. By using the mixture, rod-shaped pellets of a ceramic were prepared in the same manner as in Example 7.

Each of the eight kinds of specimens prepared as above was interposed between a fuel electrode and a reforming catalyst (a nickel catalyst was used) of a fuel cell. The fuel cells thus obtained were subjected to a power generating operation. After about 5,000 hours of operation, none of the specimens showed abnormality in the reforming catalyst.

On the other hand, fuel cells assembled without using the protective material of the present invention showed a lowering in the activity of the catalyst after about 1,000 hours of operation.

When the ability of the protective material to capture the electrolyte is lowered, the protective material is replaced with a new one, whereby degradation of the performance of the reforming catalyst can be effectively prevented over a long time.

FIG. 3 shows one embodiment of the present invention, in which an internal reforming type molten carbonate fuel cell body was assembled by using the protective material for an electrolyte according to one embodiment of the present invention. In the figure, 1 denotes an electrolyte matrix, 2 a fuel electrode, 3 an oxidizing agent electrode, 4 oxidizing agent passages, 5 a fuel-side spacer, 6 a rib, 7 a fuel gas passage, and 8 denotes a reforming catalyst, which are the same as those in the prior art example. By reference numeral 15 is denoted the protective material for the electrolyte. In this embodiment, the protective material 15 for the electrolyte is interposed between the fuel electrode 2 and the reforming catalyst 8, thereby preventing the electrolyte contained in the electrolyte matrix 1 from adhering to the reforming catalyst 8 via the fuel electrode 2.

Each of the eight kinds of specimens prepared as above-mentioned was interposed between the fuel electrode and the reforming catalyst (a nickel catalyst was used), as shown in FIG. 3. The fuels cells thus obtained were subjected to a power generating operation. After about 5,000 hours of operation, none of the specimens showed abnormality in the reforming catalyst. Besides, an increased pressure loss due to clogging of an outlet pipe was not observed.

On the other hand, fuel cells assembled without using the protective material of the present invention showed a lowering in the activity of the catalyst after about 1,000 hours of operation.

Figure 4:
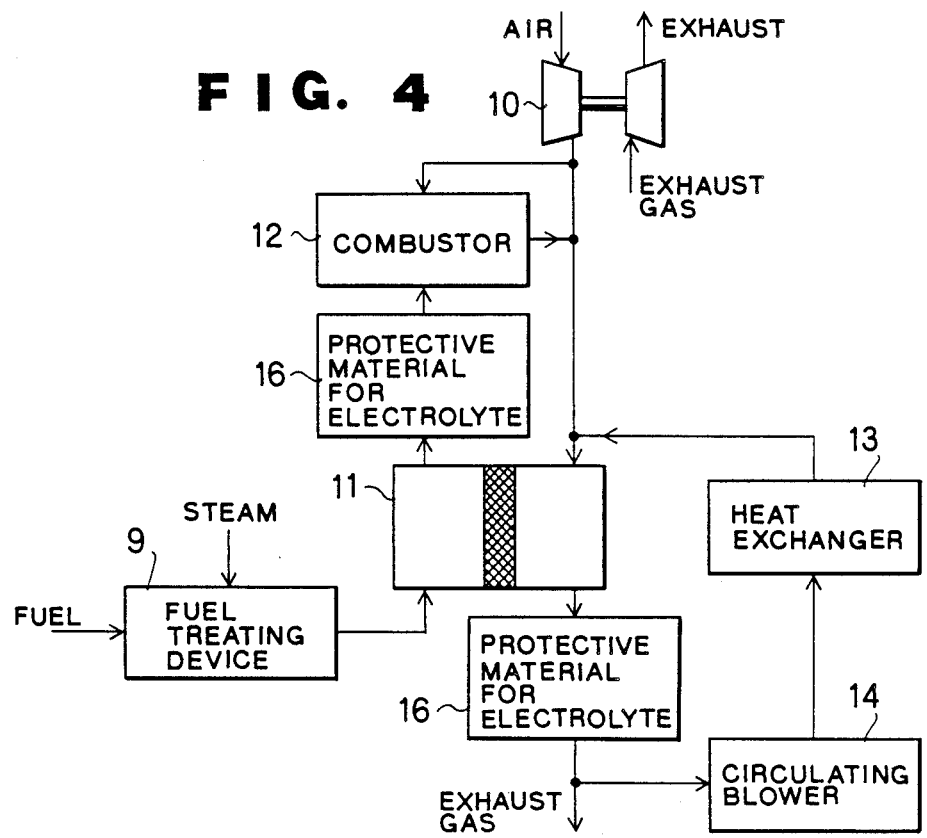
FIGS. 4 and 5 each show a system diagram illustrating the construction of an external reforming type molten carbonate fuel cell power generation system employing the protective material for an electrolyte according to one embodiment of the present invention.

FIG. 4 shows another application of the present invention, in which a power generation system is assembled by using an external reforming type fuel cell body provided with an electrolyte removing bed by employing the protective material for an electrolyte according to one embodiment of the present invention. In the figure, 16 denotes the electrolyte removing bed, namely, the bed of the protective material for the electrolyte, in which the protective material 15 for the electrolyte is held.

In such a fuel cell power generation system, the reaction gas discharged from the molten carbonate fuel cell body 11 is led first to the electrolyte removing bed 16 together with a fuel gas system and an oxidized gas system. By the function of the protective material 15 for the electrolyte, which is held in the electrolyte removing bed 16, the electrolyte contained in the reaction gas or substances formed from the electrolyte are removed from the reaction gas. Therefore, the cleaned reaction gas not containing the electrolyte is supplied to the downstream side of the electrolyte removing bed 16. As a result, in the fuel cell power generation system by the application of the present invention, it is possible to minimize the lowering in the characteristics of the component apparatuses or constituent materials due to the adhesion thereto of the electrolyte, and it is possible to carry out a stable operation for a long time. The electrolyte removing bed 16 can be easily obtained, for example, by packing a reaction pipe with particles of the protective material 15 for the electrolyte. In addition, when the protective material 15 for the electrolyte is held in an outlet-side gas manifold of the molten carbonate fuel cell body 11 or in a piping connected to the manifold, it is possible to realize a compact power generation system and to minimize the corrosion of the piping at a connection pipe portion.

Figure 5:
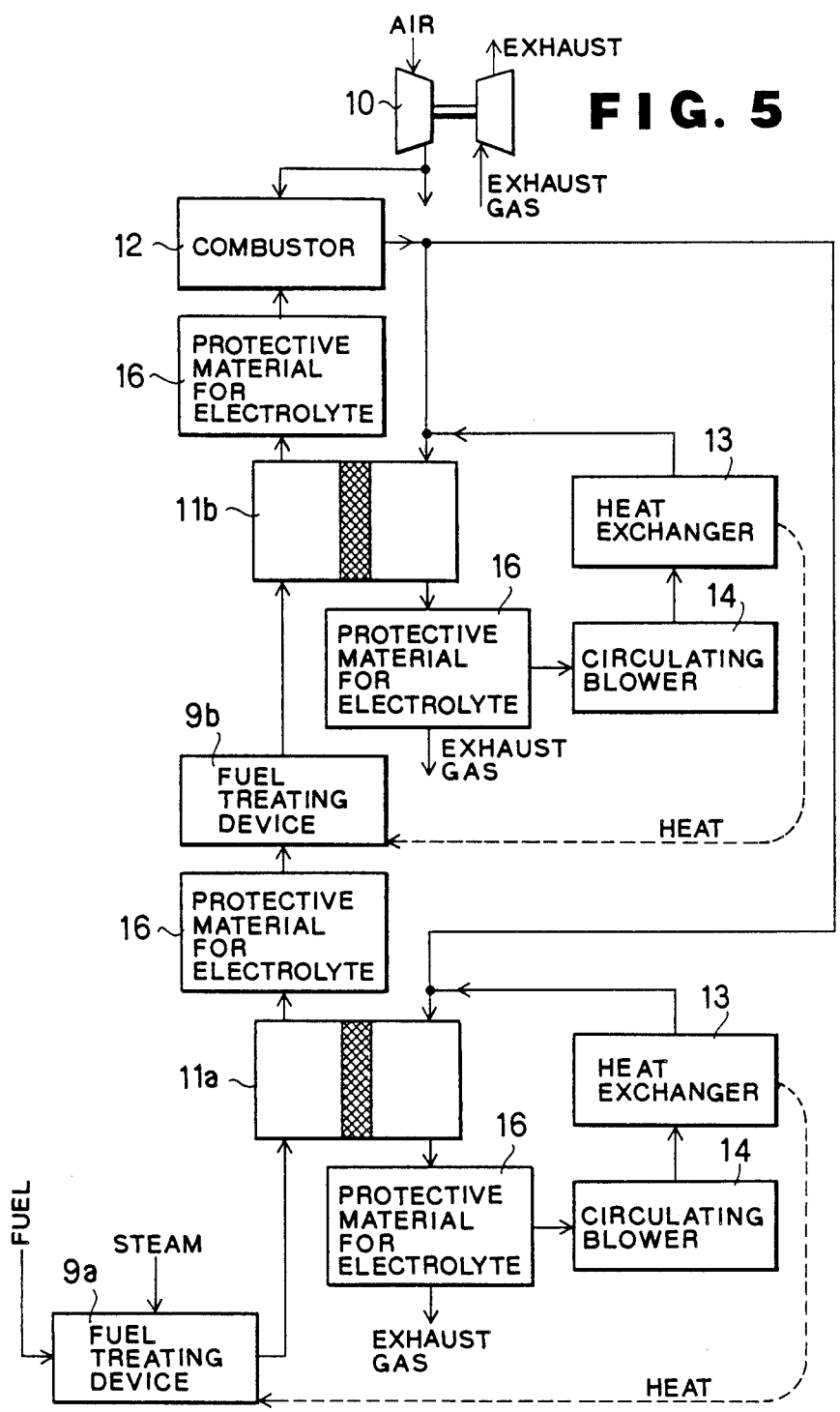

FIG. 5 shows a system diagram illustrating the construction of a fuel cell power generation system obtained by a further application of the present invention. In this fuel cell power generation system, a plurality of fuel treating devices 9 (for instance, two such devices 9a and 9b in FIG. 5) and a plurality of molten carbonate fuel cell bodies 11a and 11b are connected by a fuel gas system. The heat of reaction which is required in the fuel treating devices 9 is supplied by transferring the surplus heat generated in the fuel cell bodies 11 via a heat exchanger 13 (broken lines in FIG. 5 indicate the flow of heat).

The characteristic features of this power generation system are the following two points:

(a) the steam produced through an electrochemical reaction in the molten carbonate fuel cell body 11a is effectively utilized for the reforming reaction in the fuel treating device 9b, and (b) the surplus heat generated in the molten carbonate fuel cell bodies 11a and 11b is effectively utilized in the fuel treating devices 9a and 9b. Thus, by the effective utilization of the reaction product and the heat derived from the reactions, a high power generation efficiency is obtainable. In this application of the invention, particularly, it is possible to prevent the deterioration of the reforming catalyst held in the fuel treating device 9b, by the function of the electrolyte removing bed 16.

Though in the application of the invention shown in FIG. 5 the surplus heat generated in the molten carbonate fuel cell bodies 11a and 11b is supplied through the heat exchanger 13 to the fuel treating devices 9a and 9b as the heat of reaction, it is possible to supply the surplus heat directly to the fuel treating device, for example, by disposing the fuel treating device thermally adjacent to the fuel cell body.

Also, by holding the protective material for the electrolyte in the fuel treating devices 9a and 9b or in the molten carbonate fuel cell bodies 11a and 11b, it is possible to assemble the electrolyte removing bed 16 into the fuel treating devices 9a and 9b or into the fuel cell bodies 11a and 11b.

Besides, for effective utilization of the steam produced in the fuel cell body for the reforming reaction in the fuel treating device, a system has been studied in which a portion of the steam-rich fuel gas discharged from the fuel cell body is recycled to the fuel treating device located on the upstream side of the fuel cell body. In the system, also, the protective material 15 for the electrolyte according to the present invention can be used to prevent the lowering in the activity of the reforming catalyst due to the adhesion thereto of the electrolyte.

As has been described above, it is apparent that the protective material for an electrolyte used in a molten carbonate fuel cell power generation system according to the present invention is extremely useful.

When the ability of the protective material to capture the electrolyte is reduced, the protective material is replaced with a new one, whereby degradation of the performance of the component materials of the fuel cell power generation system can be prevented, over a long time.

As has been described above, according to the present invention, a protective material for a reforming catalyst includes a ceramic comprising an oxide material which is capable of chemically reacting with an electrolyte used in a molten carbonate fuel cell or a substance formed from the electrolyte, namely, capable of chemically reacting with the electrolyte diffused from the electrolyte matrix under the operating conditions of the fuel cell. Therefore, the present invention effectively prevents the degradation of the performance of the reforming catalyst.

Also, according to the present invention, it is possible to protect the component materials of the molten carbonate fuel cell power generation system from the electrolyte or the substance formed from the electrolyte. It is therefore possible to effectively prevent a reduction in the performance of the component materials and to ensure a longer service life.

Furthermore, when at least one of the oxide material has a melting point lower than the service temperature of the fuel cell, the at least one oxide material is melted to a liquid during use, thereby ensuring rapid reaction thereof with the electrolyte or the reaction products of the electrolyte. Thus, a protective material for the electrolyte having a higher activity is obtainable.

What is claimed is:

1. A molten carbonate fuel cell including a protective material for use in protecting components of said fuel cell from a carbonate electrolyte or a substance formed from a carbonate electrolyte, the protective material comprising a ceramic formed from an oxide material chemically reactive with a carbonate electrolyte or with a substance formed from the electrolyte, the oxide material including at least one substance having a melting point lower than the temperature at which the fuel cell is used.

2. A molten carbonate fuel cell as set forth in claim 1 wherein the oxide material is in the form of pellets.

3. A molten carbonate fuel cell as set forth in claim 1 wherein the oxide material comprises $TiO_2$ and $B_2O_3$.

4. A molten carbonate fuel cell as set forth in claim 1 wherein the oxide material comprises $SiO_2$ and $B_2O_3$.

5. A molten carbonate fuel cell as set forth in claim 1 wherein the oxide material comprises $TiO_2$, $SiO_2$ and $B_2O_3$.

6. A molten carbonate fuel cell as set forth in claim 1 wherein said components comprise at least a reforming catalyst.

7. A molten carbonate fuel cell including a protective material for use in protecting components of said fuel cell from a carbonate electrolyte or a substance formed from a carbonate electrolyte, the protective material comprising an oxide material chemically reactive with a carbonate electrolyte or with a substance formed from the electrolyte, the oxide material including $B_2O_3$ and at least one of $TiO_2$, $SiO_2$, $MoO_3$, $WO_3$, $ZrO_2$, and $GeO_2$.

8. A molten carbonate fuel cell as set forth in claim 7 wherein the oxide material is in the form of pellets.

9. A molten carbonate fuel cell as set forth in claim 7 wherein the oxide material comprises $TiO_2$ and $B_2O_3$.

10. A molten carbonate fuel cell as set forth in claim 7 wherein the oxide material comprises $SiO_2$ and $B_2O_3$.

11. A molten carbonate fuel cell as set forth in claim 7 wherein the oxide material comprises $TiO_2$, $SiO_2$ and $B_2O_3$.

12. A molten carbonate fuel cell including a protective material for use in protecting components of said fuel cell from a carbonate electrolyte or a substance formed from a carbonate electrolyte, the protective material comprising a ceramic formed from an oxide material chemically reactive with a carbonate electrolyte or with a substance formed from the electrolyte, the oxide material containing about 2% to about 50% by weight of $B_2O_3$.

13. A molten carbonate fuel cell as set forth in claim 12 wherein the oxide material is in the form of pellets.

14. A molten carbonate fuel cell as set forth in claim 12 wherein the oxide material comprises $TiO_2$ and $B_2O_3$.

15. A molten carbonate fuel cell as set forth in claim 12 wherein the oxide material comprises $SiO_2$ and $B_2O_3$.

16. A molten carbonate fuel cell as set forth in claim 12 wherein the oxide material comprises $TiO_2$, $SiO_2$ and $B_2O_3$.

17. A method of protecting components of a molten carbonate fuel cell from a carbonate electrolyte or a substance formed from a carbonate electrolyte comprising placing in a molten carbonate fuel cell a ceramic formed from an oxide material chemically reactive with a carbonate electrolyte or a substance formed from the electrolyte, the oxide material including at least one substance having a melting point lower than the temperature at which the fuel cell is used.

18. A method of protecting components of a molten carbonate fuel cell as set forth in claim 17 wherein the ceramic is interposed between an electrolyte matrix and a reforming catalyst.

* * * * *